United States Patent
Stouffer et al.

(10) Patent No.: US 10,661,917 B2
(45) Date of Patent: May 26, 2020

(54) VENT WASH COVER

(71) Applicants: Charles Stouffer, Lexington Park, MD (US); Ronald Bush, Bradfordsville, KY (US); Joan Melendez, Jacksonville, FL (US); David Hohn, San Diego, CA (US)

(72) Inventors: Charles Stouffer, Lexington Park, MD (US); Ronald Bush, Bradfordsville, KY (US); Joan Melendez, Jacksonville, FL (US); David Hohn, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 283 days.

(21) Appl. No.: 15/953,681

(22) Filed: Apr. 16, 2018

(65) Prior Publication Data

US 2019/0315492 A1   Oct. 17, 2019

(51) Int. Cl.
*B64F 5/30* (2017.01)

(52) U.S. Cl.
CPC ..................... *B64F 5/30* (2017.01)

(58) Field of Classification Search
CPC ............. B64F 5/30; B64F 1/005; B64D 37/20
See application file for complete search history.

*Primary Examiner* — Valentina Xavier
(74) *Attorney, Agent, or Firm* — Mark O. Glut; NAWCAD

(57) ABSTRACT

A vent wash cover for covering an aircraft vent with a plurality of slots. The vent wash cover includes a main body, fingers, a threaded aperture, and a hollow conic section. The main body has a first end and a second end. The fingers are disposed on the first end and correspond in size and placement to the plurality of slots such that a seal is created between the fingers and plurality of slots. The threaded aperture is disposed on the second end, and corresponds to threads of a standard thread extension pole. The hollow conic section extends outward from the threaded aperture such that the threads of the standard thread extension pole can be properly aligned from a distance for insertion into the threaded aperture.

2 Claims, 1 Drawing Sheet

VENT WASH COVER

STATEMENT OF GOVERNMENT INTEREST

The invention described herein may be manufactured and used by or for the Government of the United States of America for governmental purposes without payment of any royalties thereon or therefor.

BACKGROUND

Aircraft, particularly certain military aircraft, have a fuel system vent or a fuel system vent configuration. During a wash, water may enter the fuel system of the aircraft through the vent. Water within a fuel system particularly in a military aircraft, can cause damage and/or performance issues. Therefore, when washing, the aircraft vents, especially the vertical stabilizers vent, must be plugged to prevent water from entering the vents due to the potential of a concentrated water build-up. The current method of covering the vent in the event of an aircraft wash involves making a makeshift cover out of tape. On a military jet, like the F/A-18 E/F: or the E/A-18G, the maintainer must climb on top of the aircraft, and from the inside of the vertical tails, the maintainer reach around and then place the tape over the vent. The vent is located near the top of the tail, making it difficult to reach. This requires additional safety equipment and time, and also puts the sailor at a tall risk hazard. Therefore, there is a need for a safer way to plug aircraft vents during aircraft washes.

SUMMARY

The present invention is directed to a vent wash cover that meets the needs listed above and below.

The present invention is directed to a vent wash cover for covering an aircraft vent with a plurality of slots. The vent wash cover includes a main body, fingers, a threaded aperture, a hollow conic section. The main body has a first end and a second end. The fingers are disposed on the first end and correspond in size and placement to the plurality of slots such that a seal is created between the fingers and plurality of slots. The threaded aperture is disposed on the second end, and corresponds to threads of a standard thread extension pole. The hollow conic section extends outward from the threaded aperture such that the threads of the standard thread extension pole can be properly aligned from a distance for insertion into the threaded aperture.

It is a feature of the present invention to provide a vent wash cover whereby a maintainer can perform all operational tasks of covering a vent wash from the ground, eliminating the need to climb on top of the aircraft for venting purposes.

It is a feature of the present invention to provide a vent wash cover that eliminates the risk of water intrusion into the fuel system during a wash.

DRAWINGS

These and other features, aspects and advantages of the present invention will become better understood with reference to the following description and appended claims, and accompanying drawings wherein:

DESCRIPTION

Figure 1:
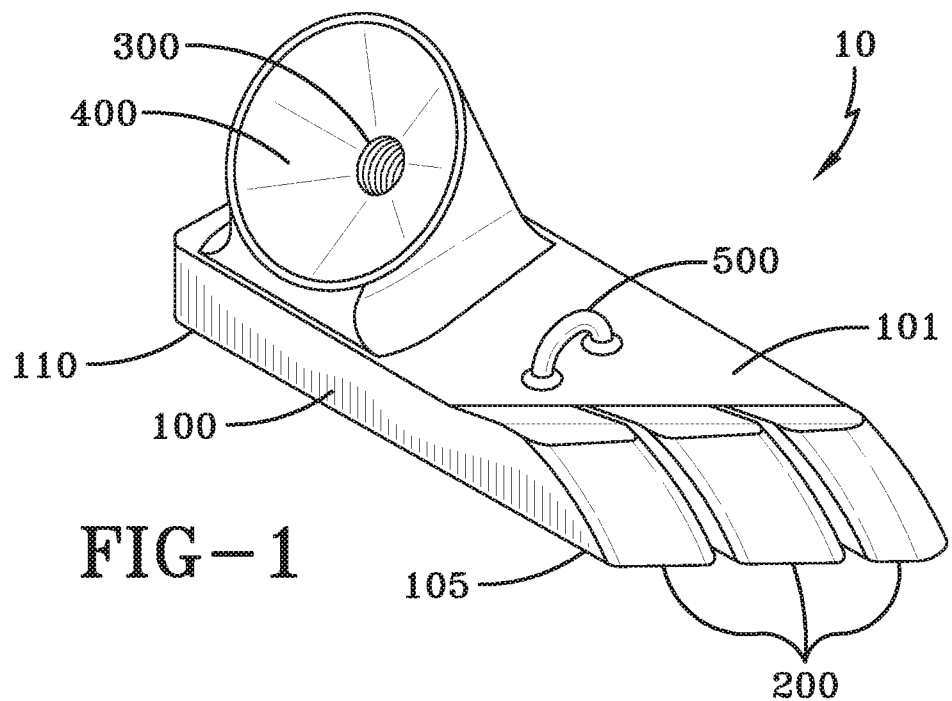
FIG. 1 is a perspective view of an embodiment of the vent wash cover.
Figure 2:
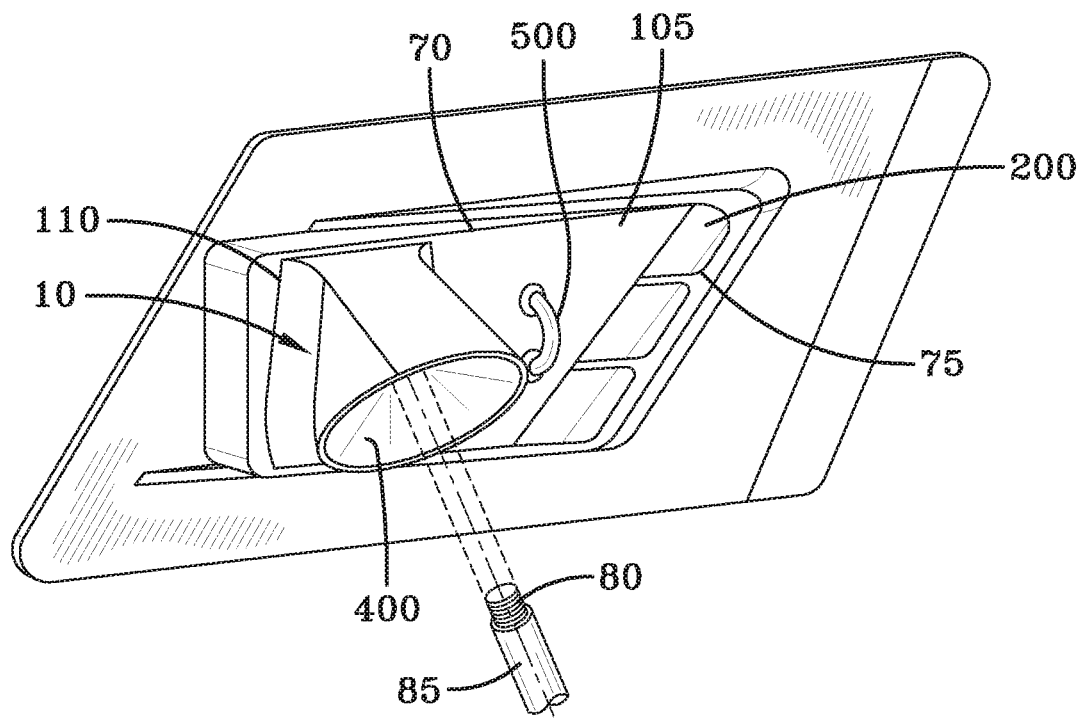
FIG. 2 is a perspective view of the vent wash cover in use.

The preferred embodiments of the present invention are illustrated by way of example below and as shown FIGS. 1 through 2. As shown in FIGS. 1 and 2, a vent wash cover 10 (for covering an aircraft vent 70 with a plurality of slots 75) includes a main body 100, fingers 200, a threaded aperture 300, and a hollow conic section 400. The main body 100 has a first end 105 and a second end 110. The fingers 200 are disposed on the first end 105 and correspond in size and placement to the plurality of slots 75 such that a seal is created between the fingers 200 and plurality of slots 75. The threaded aperture 300 is disposed on the second end 110, and corresponds to threads 80 of a standard thread extension pole 85. The hollow conic section 400 extends outward from the threaded aperture 300 such that the threads 80 of the standard thread extension pole 85 can be properly aligned for insertion into the threaded aperture 300.

In the description of the present invention, the invention will be discussed in a military environment; however, his invention can be utilized for any type of application that requires use of a vent wash cover.

In the preferred embodiment, r use on United States Navy aircraft F-18 E/F and the E/A-18G, the vent wash cover 10 includes three fingers that correspond to three slots on the F-18 E/F and E/A-18G. However, the vent wash cover 10 can have other configurations to correspond to different aircraft platforms.

The vent wash cover 10 may be one plastic piece, or made from any material practicable. Alternative plastic materials, may be used as long as the component is rigid in structure, while remaining soft on the exterior as not to damage any corrosive preventative paint or any other material on the vents 70 of various military aircraft. In the preferred embodiment, the fingers 200 may have a rubber coating. Due to the height of the application f the component, the material should remain light. The vent wash cover 10 may be manufactured, but without limitation, through 3-D printing or injection molding.

The main body 100 may include a tag loop 500 disposed substantially mid-way between the first end 105 and second end 110. In the preferred embodiment, the loop 500 protrudes so that it provides a tag attachment point. Additionally, the loop 500 may contain two loop ends, and each loop end of the loop 500 is flush with the face 101 of the main body, to create a half-ring.

When introducing elements of the present invention or the preferred embodiment(s) thereof, the articles "a," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A vent wash cover for covering an aircraft vent with a plurality of slots, the vent wash cover comprising:
   a main body, the main body having a first end and a second end;

fingers corresponding in size and placement to the plurality of slots such that a seal is created between the fingers and plurality of slots, the fingers disposed on the first end;
a threaded aperture disposed on the second end, the threaded aperture corresponding to threads of a standard thread extension pole;
a hollow conic section extending outward from the threaded aperture such that the threads of the standard thread extension pole can be properly aligned for insertion into the threaded aperture.

2. The vent wash cover of claim 1, wherein the main body includes a tag loop disposed on the main body.

\* \* \* \* \*